United States Patent [19]
Scott

[11] Patent Number: 4,891,999
[45] Date of Patent: Jan. 9, 1990

[54] SHIFT CONTROL SYSTEM FOR A HYDROMECHANICAL TRACTOR TRANSMISSION

[75] Inventor: Leonard A. Scott, Bellwood, Ill.

[73] Assignee: J. I. Case Company, Racine, Wis.

[21] Appl. No.: 246,426

[22] Filed: Sep. 19, 1988

[51] Int. Cl.⁴ .............................................. F16H 5/06
[52] U.S. Cl. ...................................... 74/337.5; 74/335
[58] Field of Search ................... 74/337.5, 497, 473 P, 74/335

[56] References Cited

U.S. PATENT DOCUMENTS

| | | | |
|---|---|---|---|
| 2,772,652 | 12/1956 | Shane et al. | 74/337.5 |
| 2,839,941 | 6/1958 | Rugen | 74/337.5 X |
| 2,956,444 | 10/1960 | Bensinger et al. | 74/337.5 X |
| 3,089,571 | 5/1963 | Schick | 74/337.5 X |
| 3,677,104 | 7/1972 | Hirozawa et al. | 74/337.5 X |
| 3,688,596 | 9/1972 | Szodfridt | 74/337.5 |
| 3,739,656 | 6/1973 | Williams et al. | 74/337.5 X |
| 3,744,344 | 7/1973 | Olsen et al. | 74/337.5 X |
| 4,228,694 | 10/1980 | Adam | 74/337.5 X |

FOREIGN PATENT DOCUMENTS

| | | | |
|---|---|---|---|
| 937034 | 12/1955 | Fed. Rep. of Germany | 74/337.5 |
| 1128304 | 4/1962 | Fed. Rep. of Germany | 74/337.5 |
| 1133988 | 7/1962 | Fed. Rep. of Germany | 74/337.5 |
| 2053685 | 7/1971 | Fed. Rep. of Germany | 192/3.57 |

Primary Examiner—Leslie A. Braun
Assistant Examiner—Christopher Campbell
Attorney, Agent, or Firm—Dressler, Goldsmith, Shore, Sutker & Milnamow, Ltd.

[57] ABSTRACT

A shift control system for automatically shifting a multi-speed hydromechanical transmission one gear ratio at a time. The shift control system includes a cam element and an electronically controlled shifter assembly. The cam element is shiftable between distinct angular positions corresponding to different and distinct gear ratios for the transmission. The shifter assembly includes an actuator for imparting movement to the control element and a pair of stop assemblies. The stop assemblies limit angular movement of the cam element in incremental steps and, thereby, sequence transmission operation to one gear ratio at a time.

5 Claims, 2 Drawing Sheets

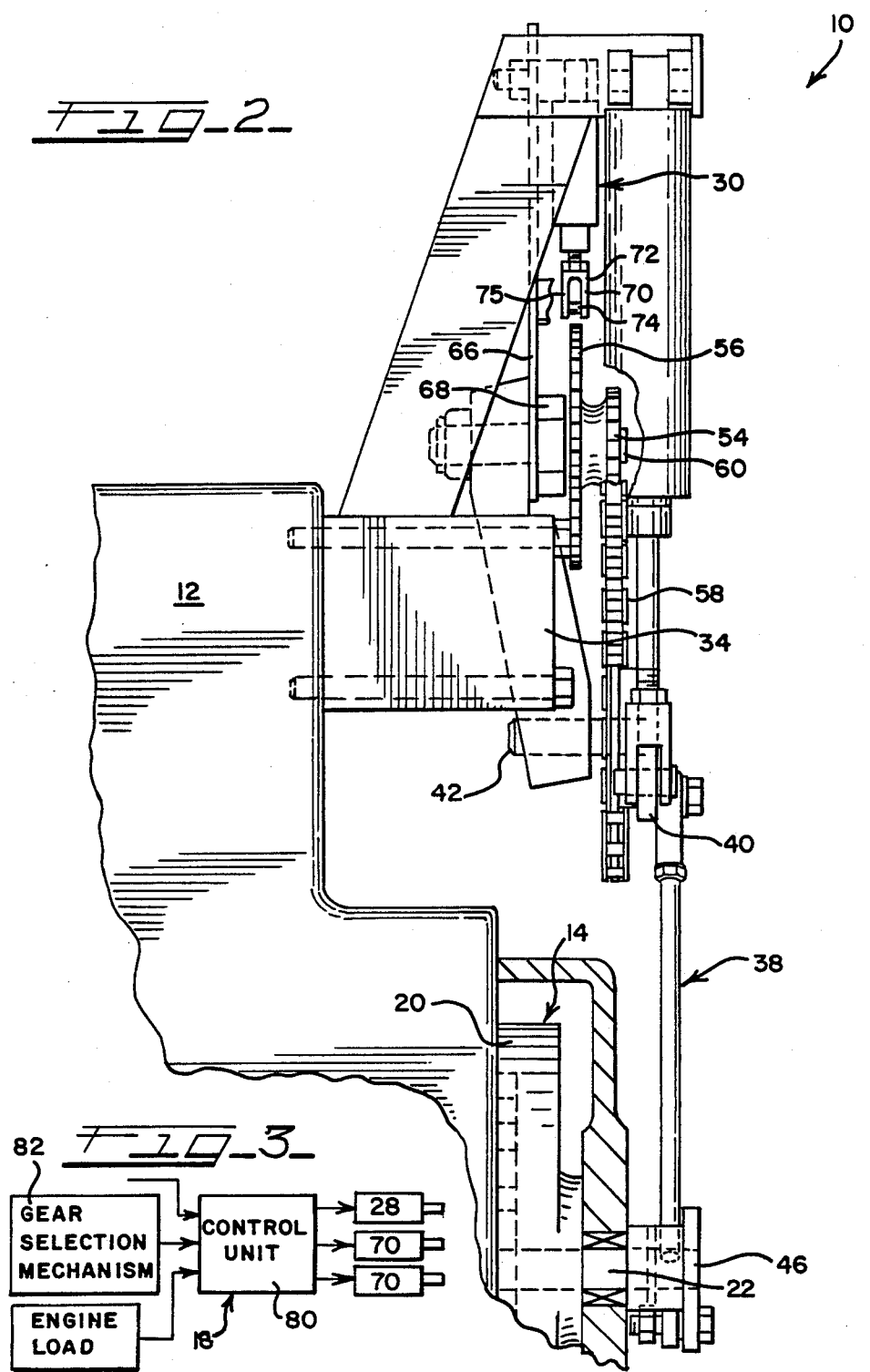

SHIFT CONTROL SYSTEM FOR A HYDROMECHANICAL TRACTOR TRANSMISSION

FIELD OF THE INVENTION

The present invention relates to hydromechanical multi-speed tractor transmissions having a plurality of hydraulic powershift clutches and, more particularly, to a control system for automatically and sequentially shifting such a hydromechanical tractor transmission one gear ratio at a time.

BACKGROUND OF THE INVENTION

Hydromechanical transmissions for tractors and the like typically include a plurality of gear ratios for providing a multitude of ground speeds for the tractor. Some tractors provide as many as 24 different forward speeds. Although 24 different speeds are provided, such a transmission develops relatively slow ground speeds with high torque. As an example, and although 24 different speeds are provided, the average difference in ground speed for the tractor between successive gear ratios is less than two miles-per-hour.

Such transmissions typically include several powershift clutches which are selectively operated to provide a respective one of the transmission's multi-gear ratios. Unlike other clutch mechanisms which operate in response to manipulation of a clutch pedal to disengage the transmission from a power source attendant to each shift or change in gear ratios, powershift clutches are typically hydraulically actuated clutch mechanisms which operate in response to pressurized fluid being directed thereto. The flow of pressurized fluid is directed to the various powershift clutches as a function of the position of an operator controlled shift lever.

The powershift clutches are arranged in the transmission such that a sequence of successively higher gear ratios, from neutral to an Nth speed, are obtainable as the shift lever is moved by the operator without disengaging the transmission from the power source. As such, each different position of the shift lever conditions the transmission to operate in a respective one of its multiple gear ratios. Each gear ratio corresponds to a different tractor speed. Naturally, efficient operation of the tractor is promoted by convenient transmission gear ratio selection.

As is known, rapid shifting of the transmission may result in rough shifts which can jolt the tractor, particularly if a shift is made under load. Because there are so many forward gear ratios and because of the relatively small difference in ground speeds, the tractor operator often finds it difficult to shift the transmission only one gear ratio at a time while progressively increasing the speed of the tractor up to the desired speed.

Understandably, the tractor operator often wants to reach the desired ground speed as fast as possible. As such, the tractor operator often times moves the shift lever too quickly thus imparting shift shock and its associated drawbacks to the tractor and often times "overshoots" the desired speed.

SUMMARY OF THE INVENTION

In view of the above, and in accordance with the present invention, there is provided a shift control system for automatically shifting a hydromechanical transmission. Such a shift control mechanism includes a control element or cam and an electronically controlled shifter assembly for moving the control element such that the transmission is sequenced one gear ratio at a time until the desired gear ratio has been achieved.

In the illustrated embodiment, the control element or cam of the shift control mechanism is rotatably mounted on the transmission. The control element is shiftable between distinct angular positions corresponding to different and distinct gear ratios for the transmission. In effect, the transmission is conditioned to operate in various gear ratios as a function of the angular position of the control element.

The shifter assembly of the present invention is responsive to electrical shift signals derived from an electronic control unit. Preferably, the control unit includes a suitably programmed microprocessor which receives input signals indicative of a desired gear ratio selection and other input signals indicative of operating performance of the tractor. The shifter assembly further includes an actuator or driver for imparting angular movement to the control element and a pair of stop assemblies. The stop assemblies are operated in concert with the actuator for limiting angular movement of the control element in incremental steps.

In accordance with the present invention, the shifter assembly preferably includes a profiled member having a series of radially extending projections thereon. Such a profiled member is driven in timed relation with the control element such that the spacing between the radial projections on the profiled member is proportional to the angular distance which the control element rotates to effect a shift in gear ratios for the transmission. The stop assemblies act in combination with the profiled member to limit angular movement of the control element to sequence shifting of the transmission one gear ratio at a time.

By having the control unit operate the shifter assembly in response to shift selection signals and performance characteristics of the tractor, the transmission may be shifted automatically one gear ratio at a time. As such, this shift control system can be used to provide automatic transmission controls for constant load or speed of the tractor when used for heavy or light load conditions.

Other features and advantages of the present invention will become readily apparent from the following detailed description, appended drawings, and the accompanying claims.

BRIEF DESCRIPTION OF THE DRAWINGS

FIG. 2 is a side elevational view of the shift control system as mounted on a hydromechanical transmission; and FIG. 3 is a simplified block diagram of an actuating circuit for the shift control system of the present invention.

DETAILED DESCRIPTION OF A PREFERRED EMBODIMENT

Figure 1:
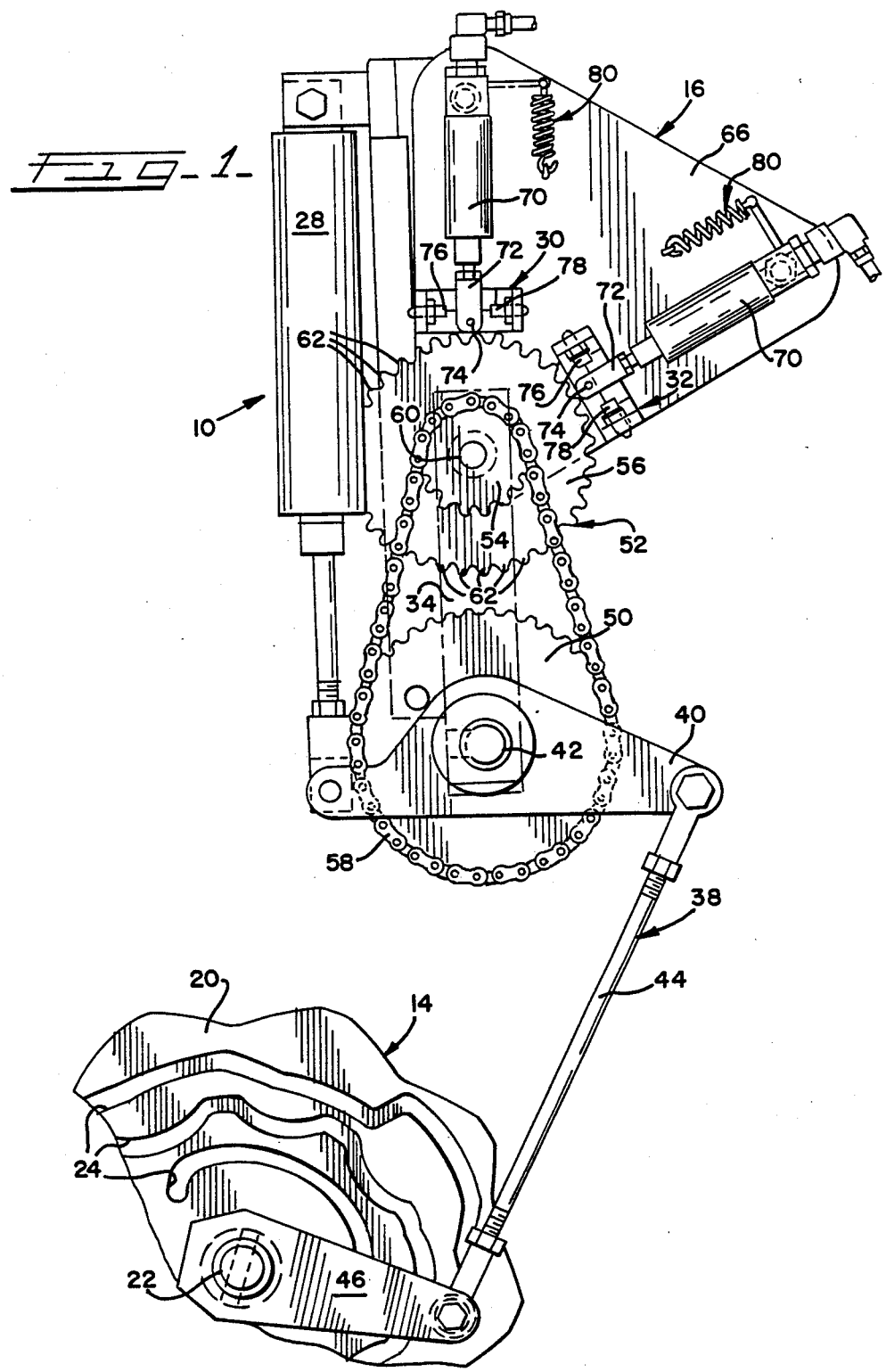
FIG. 1 is a schematic front elevational view of a shift control system according to the present invention.

While the present invention is susceptible of embodiment in various forms, there is shown in the drawings a presently preferred embodiment hereinafter described, with the understanding that the present disclosure is to be considered as an exemplification of the invention, and is not intended to limit the invention to the specific embodiment illustrated.

Referring now to the drawings, wherein like reference numerals indicate like parts throughout the several views, a tractor transmission shift control system 10 is schematically illustrated in FIG. 1. As illustrated, the shift control system controls a hydromechanical transmission 12 (FIG. 2) of the type disclosed in commonly assigned patent application Ser. No. 204,167 filed June 8, 1988; the full teachings of which are incorporated herein by reference.

Suffice it to say, the hydromechanical transmission 12 includes a plurality of hydraulically operated powershift clutch assemblies which condition the transmission to operate in various gear ratios depending upon selective clutch engagement. The clutch assemblies are controlled by various control valves whose disposition within a valve body (not shown) determines which clutch assemblies are operated and, thereby, in which gear ratio the transmission is conditioned for operation.

The control system of the present invention is provided to automatically regulate operation of such control valves and, thereby, automatically control the transmission 12. To effect such ends, the control system of the present invention includes a control element 14 and an electronically controlled shifter assembly 16 which is responsive to electrical shift signals derived from a control unit 18 (FIG. 3).

Control element 14 regulates the operable position of each clutch control valve within the valve body of the transmission. As illustrated, control element 14 includes a cam 20 mounted for rotation about a pin 22 or other suitable rotational support. Control element 14 is substantially similar to a cam actuator disclosed in commonly assigned copending patent application Ser. No. 190,493 filed May 5, 1988 now U.S. Pat. No. 4,844,127; the full teachings of which are incorporated herein by reference.

Suffice it to say, cam 20 has a specifically designed cam profile for controlling the linear disposition of each clutch control valve, and, thereby operation of the transmission as a function of the angular disposition of cam 20. In the preferred embodiment, such a cam profile is defined by one or more recessed arcuate tracks 24 which are cast or machined into the cam 20 at various radii such that they do not intersect with each other.

Shifter assembly 16 is provided to control the angular disposition of control element 14. As illustrated, shifter assembly 16 includes a driver 28 which imparts positive rotational movement to cam 20 in either angular direction. Driver 28 is illustrated as a double acting air cylinder but it should be appreciated that alternative forms for driver would include a double acting hydraulic cylinder, an electric solenoid, or a vacuum cylinder. Shifter assembly 16 further includes limit stops 30 and 32 for controlling the extent of angular rotation of control element 14.

For purposes of access and ease of manufacture, shifter assembly 16 is preferably mounted to the transmission at a location spaced from the control element 14 which it is meant to positively drive. In its preferred form, shifter assembly 16 further includes a mounting bracket 34 which is fixedly secured to the transmission. One end of driver 28 is connected to the mounting bracket 34. The opposite or operative end of driver 28 is connected to a linkage assembly 38.

Linkage assembly 38 transmutes the linear drive movement of driver 28 into rotational displacement of control element 14. As illustrated, linkage assembly 38 includes a lever 40 having a stub shaft 42 which pivotally moves with and mounts lever 40 to bracket 34 intermediate the ends of lever 40. One end of lever 40 is articulately connected to the operative end of driver 28. The opposite end of lever 40 is articulately connected to one end of an elongated link 44. The opposite end of link 44 is connected to an actuating pivot arm 46 which radially extends from the axis of pivot pin 22. As will be understood, movement of actuating pivot arm 46 imparts rotational movement to the control element 14.

A sprocket gear 50 is also mounted on pivot shaft 42 for rotation with lever 40. A combination gear 52 having axially aligned sprocket gears 54 and 56 is also pivotally mounted on bracket 34 in spaced relation with sprocket gear 50. A suitable force transfer means, such as chain 58, serves to drivingly interconnect sprocket gears 50 and 54.

Combination gear 52 is mounted for pivotal rotation on an eccentric stub shaft 60 which is carried by mounting bracket 34. The eccentricity of stub shaft 60 allows the tension of chain 58 to be regulated as required. As will be appreciated, sprocket gear 56 includes a series of radially extending teeth 62. The drive ratio between sprocket gears 50 and 54 is such that one circular pitch of gear 56 equals one gear ratio or position change for the transmission.

A support plate 66 is also secured to mounting bracket 34 by a fastener 68. Limits stops 30 and 32 are mounted on support plate 66. Since the limit stops are mirror images of each other, any description hereafter of one limit stop and the components associated therewith will also pertain to the other limit stop.

Each limit stop assembly includes a driver 70. Driver 70 is preferably an air actuated cylinder but it will be appreciated that a hydraulic cylinder, electric solenoid, or vacuum operated cylinder will suffice for purposes hereinafter described. One end of driver 70 is pivotally secured to support plate 66. The opposite or operative end of driver 70 is provided with a clevis 72 having a laterally extending locating pin 74 fixed at the free end thereof. As best seen in FIG. 2, clevis 72 includes laterally spaced depending arms 75 and 77 which are connected to each other and to the operative end of driver 70. Arms 75 and 77 are respectively disposed on opposite sides of gear 56. Locating pin or member 74 spans the distance between arms 75 and 77.

Each clevis 72 is accommodated or entrapped between a pair of stops 76 and 78. Stops 76 and 78 are secured to support plate 66 and limit the extent of pivotal movement of clevis 72 and driver 70. A spring and pin arrangement 80 normally urges the clevis 72 toward one of the stops 76, 78.

In accordance with the present invention, and as illustrated in FIG. 3, the shift control system of the present invention further includes a suitably programmed electrical control unit 18 which preferably comprises microprocessor circuitry. Microprocessor circuitry is preferred for its compact size, reliability, versatile program ability, and radial availability at reasonable costs.

Control unit 18 includes electrical circuitry which is programmed to provide sequential operation of drivers 28 and 70 for effecting transmission shifting responsively to shift signal and other inputs from a plurality of sources.

Control unit 18 receives shift signal inputs from an operator controlled gear ratio selecting mechanism 82. Control unit 18 also receives other signal inputs indicative of engine load, tractor speed, and etc. which are calculated by the control unit and effect transmission shifting. Control unit 18 operates the drivers 28 and 70 in a manner sequencing the transmission one gear ratio at a time.

In operation, control unit 18 provides output shift signals to the drivers 28 and 70. The shift signal to driver 28 imparts rotational movement to control element 14 in a desired direction. More specifically, the linear movement of driver 28 is transmuted into rotational movement of cam 20 through lever 40, link 44, and actuating pivot arm 46. Because driver 28 positively moves lever 46 in either direction, the transmission gear ratio may be incrementally increased or decreased positively in both directions.

The extent of angular rotation of control element 14 is regulated by the shifter assembly 16. Upon actuation of driver 28, lever 40 is rotated. Sprocket gear 50 and combination gear 52 are likewise rotated with the lever 40. The circular pitch of the radial projections or teeth 62 on gear 56 is such that one circular pitch change past either stop means 30, 32 equals one gear ratio change of the transmission.

Besides energizing driver 28, the shift signals from control unit 18, likewise regulates operation of stop means 30, 32. One stop means is operated to control transmission up shifting one gear ratio at a time. The other stop means is operated to control transmission downshifting one gear ratio at a time. When driver 70 of either stop means is energized, the clevis 72 associated therewith is forced downwardly moving locating pin 74 into engagement with sprocket gear 56. As sprocket gear 56 rotates as a result of rotation of lever 40, pivotal movement thereof moves the clevis 72 therewith into contact with either of the stops 76 or 78 depending upon the direction of rotation of the combination gear 52 and whether the transmission is being shifted up or down. The lateral spacing between stops 76 and 78 is sufficient to allow the cam 20 to index sufficiently to incrementally change the transmission condition one gear ratio at a time.

Engagement of clevis 72 with either stop 76 or 78 will prevent further rotation of the combination gear and prevent further indexing of the control element 14. As such, transmission 12 will be shifted one gear ratio and thereafter operated in that particular gear ratio until driver 70 receives another shift signal received from control unit 18 in a manner releasing driver 70 and allowing retraction of clevis 72 thereby allowing further indexed movement of the control element 14. Because sequential operation of the drivers 28 and 70 is automatically controlled as a result of the shift signal inputs provided to the control unit 18, this shift system can be used to provide automatic transmission control for constant load or speed of the tractor when used for heavy or light load conditions.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A shift control system for a hydromechanical tractor transmission which is shiftable between a plurality of different gear ratios, said shift control system comprising:
   a cam mounted on said transmission for rotation about a pivot and between a series of distinct angular positions, said cam defining a cam profile which controls in which gear ratio said transmission is operated as a function of the angular disposition of said cam; and
   an electronically controlled cam shifter assembly which is responsive to electric shift signals derived from a control unit, said cam shifter assembly comprising actuating means responsive to said electric shift signals and including a driver and connecting means between the driver and said cam for rotatably shifting the cam and imparting angular movement thereto, a profiled member driven in timed relation to said cam and having a series of spaced radial projections thereon, the spacing between said projections being equal to a distance the cam must be rotated to effect a change in gear ratios, and stop means operated in response to said electric shift signals and in timed concert with said actuating means for limiting angular movement of said cam in incremental steps.

2. The shift control system of claim 1 wherein said stop means act in combination with said profiled member to limit angular movement of said cam.

3. The shift control system of claim 1 wherein said stop means includes a driver having one end pivotally mounted and a free end which acts against the radial projections on said profiled member.

4. The shift control system of claim 3 wherein said free end of the stop means driver is entrapped between a pair of laterally spaced stops.

5. A shift control system for automatically shifting a hydromechanical transmission through a series of different gear ratios, said shift control system comprising:
   a rotatably driven control element mounted on said transmission and shiftable between distinct angular positions in a manner conditioning the transmission to operate in different gear ratios depending upon the angular position of said control element;
   actuating means for imparting rotational movement to said control element, said actuating means including a driver connected to said control element through a linkage assembly;
   means for limiting rotational movement to said control element by acting against a profiled member in a locking manner controlling the angular position of said control element, said profiled member being driven in timed relation with said control element and defines a series of spaced radial teeth, the spacing between said teeth being proportional to distinct angular positions of said control element, said limiting means further includes a pair of drivers each of which includes a member which is movable toward and engagable with said teeth on said profiled member and is accommodated between a pair of laterally spaced stops, with one driver of said limiting means acting to control the angular position of said control element during transmission up-shifts and the other driver of said limiting means acting to control the angular position of said control element during transmission down-shifts; and
   control circuitry means responsive to input signals from an operator influenced shifter for operating said actuating means and said limiting means in a manner automatically controlling the position of said control element and thereby transmission operation.

* * * * *